United States Patent
Kazmi et al.

(10) Patent No.: US 8,594,690 B2
(45) Date of Patent: Nov. 26, 2013

(54) SUBCELL MEASUREMENT PROCEDURES IN A DISTRIBUTED ANTENNA SYSTEM

(75) Inventors: Muhammad Kazmi, Bromma (SE); Bengt Lindoff, Bjärred (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 89 days.

(21) Appl. No.: 13/142,437

(22) PCT Filed: Dec. 29, 2008

(86) PCT No.: PCT/SE2008/051564
§ 371 (c)(1), (2), (4) Date: Jun. 28, 2011

(87) PCT Pub. No.: WO2010/077192
PCT Pub. Date: Jul. 8, 2010

(65) Prior Publication Data
US 2011/0269449 A1    Nov. 3, 2011

(51) Int. Cl.
H04W 4/00 (2009.01)

(52) U.S. Cl.
USPC ........ 455/452.1; 455/441; 455/442; 455/437; 455/438; 455/562.1; 370/331; 370/332; 370/333

(58) Field of Classification Search
USPC ............... 455/456.1–456.5, 436–438, 452.1, 455/441–442; 370/331–333
See application file for complete search history.

(56) References Cited

U.S. PATENT DOCUMENTS

| | | | |
|---|---|---|---|
| 6,442,389 B1 * | 8/2002 | Marcum | 455/437 |
| 6,529,745 B1 * | 3/2003 | Fukagawa et al. | 455/562.1 |
| 2004/0248568 A1 | 12/2004 | Lucidarme | |

FOREIGN PATENT DOCUMENTS

| | | |
|---|---|---|
| EP | 1569492 A2 | 8/2005 |
| GB | 2358550 A | 7/2001 |
| WO | 01/58201 A1 | 8/2001 |
| WO | 2008/050230 A2 | 5/2008 |

OTHER PUBLICATIONS

3rd Generation Partnership Project. "Measurement and Measurement Reporting of E-UTRAN Cells." 3GPP TSG-RAN WG2 Meeting #64, R2-087437, Prague, Czech Republic, Nov. 10-14, 2008.

* cited by examiner

*Primary Examiner* — Kiet Doan
*Assistant Examiner* — Michael T Vu
(74) *Attorney, Agent, or Firm* — Coats & Bennett, P.L.L.C.

(57) ABSTRACT

Methods and apparatus are disclosed for reporting downlink signal measurement information in a wireless communication system utilizing coordinated multipoint transmission from two or more subcells in each of a plurality of cells. The method comprises monitoring signal quality metrics for a first set of downlink signals comprising at least a first common channel signal transmitted from two or more subcells of a neighbor cell, evaluation of the monitored signal quality metrics, with respect to one or more predetermined criterion, and the selective increasing of a measurement rate, an event evaluation rate, or both, for at least a first subcell-specific signal from the neighbor cell, based on the evaluation.

37 Claims, 8 Drawing Sheets

SUBCELL MEASUREMENT PROCEDURES IN A DISTRIBUTED ANTENNA SYSTEM

TECHNICAL FIELD

The present invention generally relates to wireless communication systems, and particularly relates to methods and apparatus for reporting downlink signal measurement information in a wireless communication system utilizing coordinated multipoint transmission from multiple subcells in each of a plurality of cells.

BACKGROUND

The $3^{rd}$-Generation Partnership Project (3GPP) has initiated a study of potential improvements to be included in a further advanced version of the Evolved Universal Terrestrial Radio Access Network (E-UTRAN), commonly known as the Long-Term Evolution (LTE) system. (The anticipated improved version is commonly referred to as LTE-Advanced.) One of the several objectives of the study is that there should be a manyfold increase in spectral efficiency and system/user throughput, especially at cell edges, in comparison with legacy systems. Legacy systems such as WCDMA and E-UTRAN, which uses OFDMA, reuse transmission frequencies in adjacent cells, allowing efficient use of sparse spectrum resources. However, this also leads to inter-cell interference, especially at cell edges, which is generally mitigated by employing advanced receivers at the base stations and mobile terminals. In an advanced E-UTRAN system the inter-cell interference is expected to be restricted by architectural means in addition to traditional means based on advanced receivers. One such arrangement to be employed is called a distributed antenna system (DAS).

In a wireless system that employs a distributed antenna system (DAS), each cell in a network of several cells includes two or more spatially separated antenna nodes, remote antenna units, base station sites, or so-called sub-base stations, connected to a common source via a transport network. This group of spatially distributed nodes, or subcells, together provide wireless service to mobile terminals within the boundaries of a specific geographic area, or cell. Each of these nodes, or sub-base stations, within a DAS cell can be passive amplifiers, or each may contain full signal processing capability (i.e., a transceiver). All sites within a particular cell are tightly synchronized.

Another commonly termed used in the current literature for DAS is coordinated multipoint transmission/reception (CoMP). However, in the discussion that follows, the term DAS will generally be used, with the understanding that this term is intended to refer broadly to systems utilizing coordinated multipoint transmission and reception from multiple subcells in a cell, including those systems currently proposed within 3GPP. Furthermore, although various sites within a DAS cell may have slightly varying levels of functionality, all of these sites within a DAS cell will generally be referred to as sub-base stations in the discussion that follows, while the area covered by each sub-base station will be referred to as a subcell. Similarly, the area covered by a coordinated group of DAS subcells will be referred to as a DAS cell.

FIG. 1 illustrates the basic concept of a DAS-based architecture, showing multiple DAS cells 110, each of which includes several DAS sub-base stations 120. The area served by a given DAS sub-base station 120, i.e., the subcell, is smaller than the area of the entire DAS cell 110. Thus, the general idea in a wireless system using DAS is to split the transmitted power among several sites separated in space so as to provide coverage over the same area as a conventional, single-base station cell, but with reduced transmission power levels and improved reliability. This approach leads to reduction in the inter-cell (and inter-site) interference.

Typically, the UE receives signals from more than one site in a DAS cell 110, i.e., multiple subcells may simultaneously serve a user. Since the sub-base stations within a DAS cell 110 are all coordinated, i.e., synchronized, the mobile terminal can receive the transmitted data transparently and coherently.

Those skilled in the art will appreciate that the introduction of DAS will impact many receiver processes, including cell search procedures and the periodic signal measurements required for performing cell reselection and handover. Accordingly, suitable procedures for measuring downlink signals and reporting the resulting measurement information are needed.

SUMMARY

In some embodiments of the present invention, a mobile terminal operating in a wireless communication system utilizing DAS is configured to selectively increase a rate of measurement or event evaluation activity, or both, for one or more subcell-specific signals in response to the satisfaction of one or more criterion related to one or more regularly monitored signals, such as a common channel signal from a target cell. These criterion might include, for example, whether a common channel signal for a target DAS cell exceeds a threshold, whether a target DAS cell signal quality exceeds a common channel signal quality for the serving DAS by a minimum threshold, whether an aggregated signal quality for two or more strongest subcells of a target DAS cell exceeds a threshold, whether a relative difference between an aggregated signal quality for two or more strongest subcells of a target DAS cell and a common channel signal quality for a DAS cell rises above a threshold, and/or whether a relative difference between a signal quality for a single subcell-specific signal exceeds a common channel signal quality (for a target or serving cell) by at least a predetermined threshold. The common channel signals in any of these embodiments may comprise one or more of a common synchronization channel signal, common reference symbols, common broadcast channel signals, or the like, transmitted identically from each subcell in a given DAS cell.

Compared to a conventional solution in which the mobile terminal must continuously measure and evaluate corresponding events for each identified subcell, the techniques disclosed herein reduce processing and signaling overheads at both the mobile terminal and the network. In particular, the processing in the mobile terminal is reduced since it will measure and evaluate selected subcells in a given DAS cell only when needed, e.g., when handover is imminent. The reduction in mobile terminal processing may be of particular benefit in discontinuous receive (DRX) mode, in some embodiments of the invention.

Accordingly, an exemplary method for reporting downlink signal measurement information, such as might be implemented in a wireless terminal served by a serving cell in a wireless communication system utilizing coordinated multipoint transmission from two or more subcells in each of a plurality of cells, includes the monitoring of signal quality metrics for a first set of downlink signals comprising at least a first common channel signal transmitted from two or more subcells of a neighbor cell. The monitored signal quality metrics are evaluated, with respect to one or more predetermined criterion, and a measurement rate, an event evaluation rate, or both, are selectively increased for at least one subcell-specific signal from the neighbor cell, based on the evaluation. Signal quality data for the first subcell-specific signal, which may include measurement data and/or event data, is then sent to a serving base station. In some embodiments, increasing the measurement rate, event evaluation rate, or both, comprises increasing the measurement rate for the first subcell-specific signal from a first rate to a second rate, wherein the first rate is greater than zero. In others, increasing the measurement rate, event evaluation rate, or both, comprises increasing the measurement rate for the first subcell-specific signal from zero to a non-zero measurement rate.

Some embodiments of the method are further characterized in that evaluating the monitored signal quality metrics comprises comparing a measured signal quality for the first common channel signal to a predetermined threshold, wherein the measurement rate for the first subcell-specific signal is increased if the measured signal quality exceeds the predetermined threshold. In these and other embodiments, the first set of signals may further comprise a second common channel signal transmitted from two or more subcells of the serving cell, in which case the method may further include comparing a first quality metric for the first common channel signal to a second quality metric for the second common channel, so that the measurement rate for the first subcell-specific signal is increased if the difference between the first and second measured quality metrics exceeds a predetermined threshold.

In still other embodiments, the first set of signals may include at least two subcell-specific signals from the neighbor cell, such that evaluating the monitored signal quality metrics comprises comparing an aggregate signal quality for two or more of the at least two subcell-specific signals from the neighbor cell to a predetermined threshold, and wherein the measurement rate and/or the an event evaluation rate for the first subcell-specific signal is increased if the aggregate signal quality is above the predetermined threshold. Other embodiments in which the first set of signals comprises at least two subcell-specific signals from the neighbor cell are characterized in that evaluating the monitored signal quality metrics comprises comparing an aggregate signal quality for two or more of the at least two subcell-specific signals from the neighbor cell to a second signal quality for the first common channel signal (corresponding to the neighbor cell), such that the measurement rate and/or an event evaluation rate for the first subcell-specific signal is increased if the difference between the aggregate signal quality and the second signal quality exceeds a predetermined threshold. In still others, the aggregate signal quality for two or more subcell-specific signals from the neighbor cell are compared to a signal quality for a common channel signal from the serving cell, and a measurement rate and/or event evaluation rate for the first subcell-specific signal is increased if the difference between the aggregate signal quality and the second signal quality exceeds a predetermined threshold.

In any of the methods described herein, the signal quality metrics for one or more monitored common channel signals may comprise one or more of a received signal strength, a signal-to-interference-plus-noise ratio, a reference signal received power, and a reference signal received quality. In some embodiments, one or more of the monitored common channel signals may comprise a common synchronization channel, common reference signals, and/or a broadcast channel. In some embodiments of any of the methods described herein, a predetermined threshold used in evaluating the monitored signal quality metrics may be received from the serving cell.

Apparatus corresponding to the methods described herein are also disclosed, including various wireless communication devices for use in a wireless communication system utilizing coordinated multipoint transmission from two or more subcells in each of a plurality of cells. These wireless communication devices include signal processing circuitry configured to carry out one or more of the specific measurement, event evaluation, and reporting techniques described herein. Of course, the present invention is not limited by the above summary of features and advantages. Those skilled in the art will appreciate additional features and advantages upon reading the following detailed description, and upon viewing the accompanying illustrations of example embodiments.

DETAILED DESCRIPTION

Figure 1:
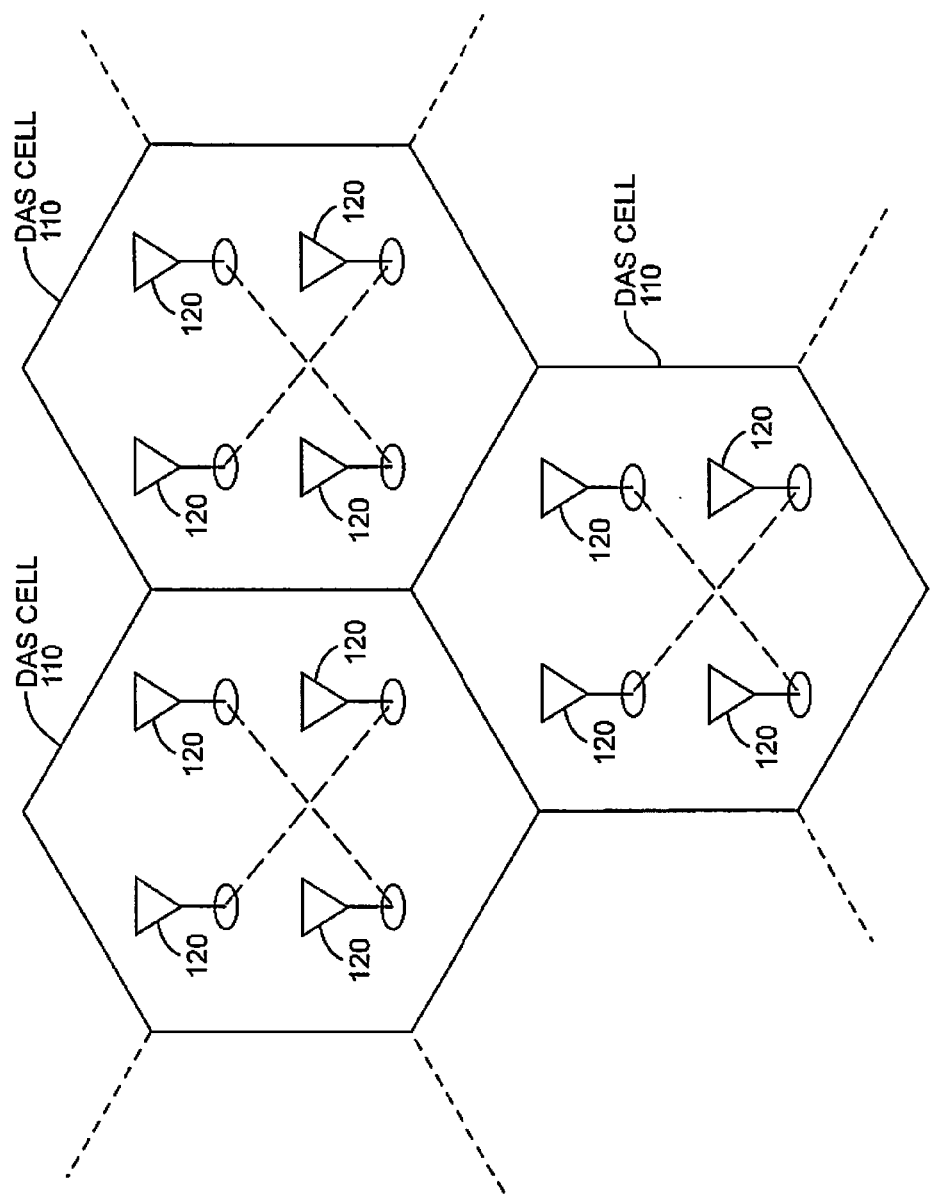
FIG. 1 illustrates a portion of an exemplary Distributed Antenna System (DAS) according to some embodiments of the present invention.

As used herein, the word "exemplary" means "serving as an example, instance, or illustration," and is not to be understood to suggest that an embodiment or configuration described as exemplary should be considered as preferred or advantageous over other embodiments. Furthermore, although the present disclosure focuses on components of an LTE-advanced (or advanced E-UTRAN) system as exemplary targets for application of the inventive concepts and techniques disclosed herein, those skilled in the art will appreciate that these techniques may be applied to alternate embodiments and other wireless systems without departing from the scope of the present invention.

As currently planned for LTE-advanced systems, there will be one or more common channel signals, such as reference signals, broadcast channel signals, and synchronization signals, that are identically transmitted from all subcells in a DAS cell. Thus, the term "common channel signal" here generally means that the transmitted signal is common to two or more subcell signals received from the same DAS cell. In the usual situation, of course, a common channel signal is transmitted by all subcells in the DAS cell, although a given mobile terminal may not be able to individually detect the signals from one or more of the most remote subcells. In any event, a common synchronization signal allows a mobile terminal to identify the DAS cell, regardless of which sub-base station or stations that the mobile terminal can actually "hear."

Additional synchronization and reference signals, specific to each subcell, are also likely to be transmitted. For instance, subcell-specific identification signals (transmitted, for instance, as part of subcell-specific synchronization signals) will enable a mobile terminal to uniquely identify each subcell in a DAS cell. Similarly, subcell-specific reference signals are also likely to be transmitted to enable demodulation of individual stream from a subcell. These subcell-specific reference signals could be further used for performing subcell-specific signal quality measurements, such as for neighbor cell measurements.

Subcell identifiers included in a subcell-specific signal need not be unique within a complete wireless system, but may be reused in neighboring DAS cell. Thus, a subcell can be uniquely identified by a combination of DAS cell identifier and subcell identifier. For the purposes of describing the present invention, it is generally assumed in the present discussion that subcell-specific synchronization and reference signals are transmitted by each sub-base station. For compatibility with legacy mobile terminals (i.e., terminals that are not adapted for advanced-LTE operation), the reference signals and synchronization signals (primary synchronization sequence and secondary synchronization sequence) currently specified for E-UTRAN can be transmitted. Additional subcell-specific synchronization and reference signal, for use by mobile terminals that support advanced E-UTRAN, can be transmitted in resource elements that are not currently used for any common channels, i.e., in some of those resource elements that are currently allocated for data transmissions in E-UTRAN. Those skilled in the art will appreciate that these subcell-specific synchronization and reference signals can be mapped to available resource elements in a variety of ways, and may be transmitted according to any of a wide variety of formats, modulation schemes, and the like. Since the particular design of subcell-specific synchronization and reference signals is not necessary to a complete understanding of the present invention, further details of the design of these signals are not provided herein.

In current discussions of DAS-based systems, it is generally assumed that a mobile terminal is required to identify subcells in DAS cells and report information related to the received subcell signals to the network. This is particularly useful in frequency-division duplexing (FDD) systems, where it is impractical to infer downlink signal conditions from received uplink signals, using a channel reciprocity principle. The network uses the reported information to select the most appropriate subcells for communication between the mobile terminal and network; this selection is especially important when it becomes necessary to handover a mobile terminal from one DAS cell to another. If conventional neighbor cell measurement processes are simply extended to every subcell signal in the vicinity of a mobile terminal, the number of measurements could increase dramatically. This in turn would also lead to more frequent evaluation and reporting of events, which are needed for carrying out mobility based decision at the network. However, these measurement, event evaluation, and reporting processes can be significantly improved using the techniques described herein.

In conventional systems, a mobile terminal first identifies one or more neighbor cells from which the mobile terminal can detect a signal. Signals from these neighbor cells are then regularly measured until they become too weak to be of interest. A typical neighbor cell measurement is averaged over a duration sufficient to filter out fading effects, since the main objective is to take mobility decisions. When E-UTRAN systems are upgraded to support DAS, the currently existing E-UTRAN neighbor cell measurement processes are likely to be reused, at least for those measurements performed on the entire DAS cell. As will be shown in further detail below, DAS cell measurements, which may be performed using one or more of the common channel signals discussed above, are selectively supplemented with subcell-specific measurements in some embodiments of the present invention. Furthermore, the measurements and methodologies applied to these selective sub-cell-specific measurements may be adapted from existing E-UTRAN measurement principles and methodology.

In E-UTRAN, two downlink neighbour cell measurements are specified: a reference symbol received power (RSRP), and a reference symbol received quality (RSRQ), which is defined as being equal to the RSRP divided by the overall carrier received signal strength (RSSI). Details of these measurements are provided in 3GPP TS 36.214, "$3^{rd}$ Generation Partnership Project; Technical Specification Group Radio Access Network; Evolved Universal Terrestrial Radio Access (E-UTRA); Physical layer—Measurements (Release 8)," v8.4.0, September 2008. There are also existing requirements for a mobile terminal to support measurements from a predetermined number of cells (serving and neighbor). In order to reduce signaling overheads, a mobile terminal can be configured (e.g., using a control channel message transmitted to the mobile terminal by the network) to report an "event" when certain conditions are met. This approach reduces signaling, since the alternative is for the mobile terminal to continuously report data for the measurements on serving and neighbour cells. In E-UTRAN, these reported events are used by the network to take mobility related decisions in connected mode. Events configured by the network for reporting may be based on signal strength measurements (e.g. RSRP) or signal quality measurements (e.g., RSRQ), or both. In addition an event can be absolute, e.g., based on single cell, or relative, e.g., based on a comparison between signals from two cells (generally between serving and neighbour cells). In E-UTRAN systems, one or more events are typically configured for a mobile terminal, and the associated thresholds or other parameters signaled to the mobile terminal by the network.

As currently specified, events that may be configured in E-UTRAN systems include:

Event A1 (a serving cell signal strength or quality becomes better than threshold);

Event A2 (a serving cell signal strength or quality becomes worse than threshold);

Event A3 (Neighbor cell signal becomes better than the serving cell signal by a pre-determined offset);

Event A4 (a neighbor cell signal measurement becomes better than a threshold);

Event A5 (a serving cell signal measurement becomes worse than a first threshold, and a neighbor cell signal measurement becomes better than a second threshold);

Event B1 (an Inter-RAT neighbor signal becomes better than a threshold); an

Event B2 (a serving cell signal becomes worse than a first threshold and an inter-RAT neighbor signal becomes better than a second threshold).

In conventional E-UTRAN systems, no events are reported to the network in idle mode. However, the same measurements can be used for cell reselection, where the reselection parameters are signaled by the network on a broadcast channel. The cell reselection algorithms, which are in some sense analogous to events in connected mode, are specified in the standard to ensure well defined mobile terminal behavior, e.g., in 3GPP TS 36.304, "$3^{rd}$ Generation Partnership Project; Technical Specification Group Radio Access Network; Evolved Universal Terrestrial Radio Access (E-UTRA); User Equipment (UE) procedures in idle mode (Release 8)", v8.3.0, September, 2008.

As noted above, if conventional E-UTRAN measurement, event evaluation, and reporting processes are simply extended to all identified sub-cell signals, the number of measurements, evaluations, and reports can grow significantly. One simple solution to this problem is to require that a mobile terminal only report events and/or measurements from a pre-determined number of strongest identified target DAS cells to the serving DAS cell. However, although this approach reduces signaling and processing overheads, it does not allow the selection of a set of best subcells for transmission at the target cell immediately after a handover. The target DAS cell could then select the best subcells for handover based on an uplink transmission from the mobile terminal during handover, e.g., a random access channel (RACH) transmission. However, because the RACH burst is short, the selection of the best subcells may not be very reliable. The target DAS cell would then have to reallocate the subcells when it has received a more reliable signal from the mobile terminal. A drawback to this solution is that interference in a DAS cell will actually increase, to the extent that less than optimal subcells are initially allocated, until the correct subcells are assigned to the mobile terminal. In addition, user throughout can be degraded, due to delays in selection of the desired set of subcells.

Another possibility is that a mobile terminal reports events and/or measurements from a pre-determined number of the strongest identified subcells in each target DAS cell. However, this approach might require a mobile terminal to perform excessive measurements and/or event evaluation, since the mobile terminal may be required to simultaneously monitor several target DAS cells. This could increase mobile terminal complexity, as well as signaling overheads. Furthermore, excessive measurements and event evaluation will reduce mobile terminal battery life, particularly when the mobile terminal is operating in discontinuous receive (DRX) mode.

In contrast to these solutions, in several embodiments of the present invention a mobile terminal performs measurements (e.g., RSRP and RSRQ) and evaluates events in one or more identified target DAS cells or subcells, and selectively increases measurement and event evaluation activity for one or more identified subcells in the event that one of one or more predetermined conditions are satisfied. These predetermined conditions might include, but are not limited to, one or more of the following:

a target DAS cell received signal quality (corresponding to a common synchronization or common reference signal, for example) is above a pre-determined threshold;

a target DAS cell received signal quality, when compared to that of the serving DAS cell, is above a predetermined threshold;

an aggregated signal quality for multiple strongest subcells in a target DAS cell falls below a predetermined threshold;

a relative difference between a common channel signal for a target DAS cell or serving DAS cell and aggregated signal quality for multiple subcell signals in a target DAS cell falls below a predetermined threshold; and a relative difference between a particular subcell signal quality and a DAS cell common channel signal quality rises above a predetermined threshold.

These and other scenarios will be described further in the discussion that follows. Those skilled in the art will appreciate that the above schemes, and variants thereof, can considerably reduce processing and signaling overheads at a mobile terminal and the supporting network, compared to alternatives in which all or a large subset of identified subcell signals are continuously monitored.

Figure 2:
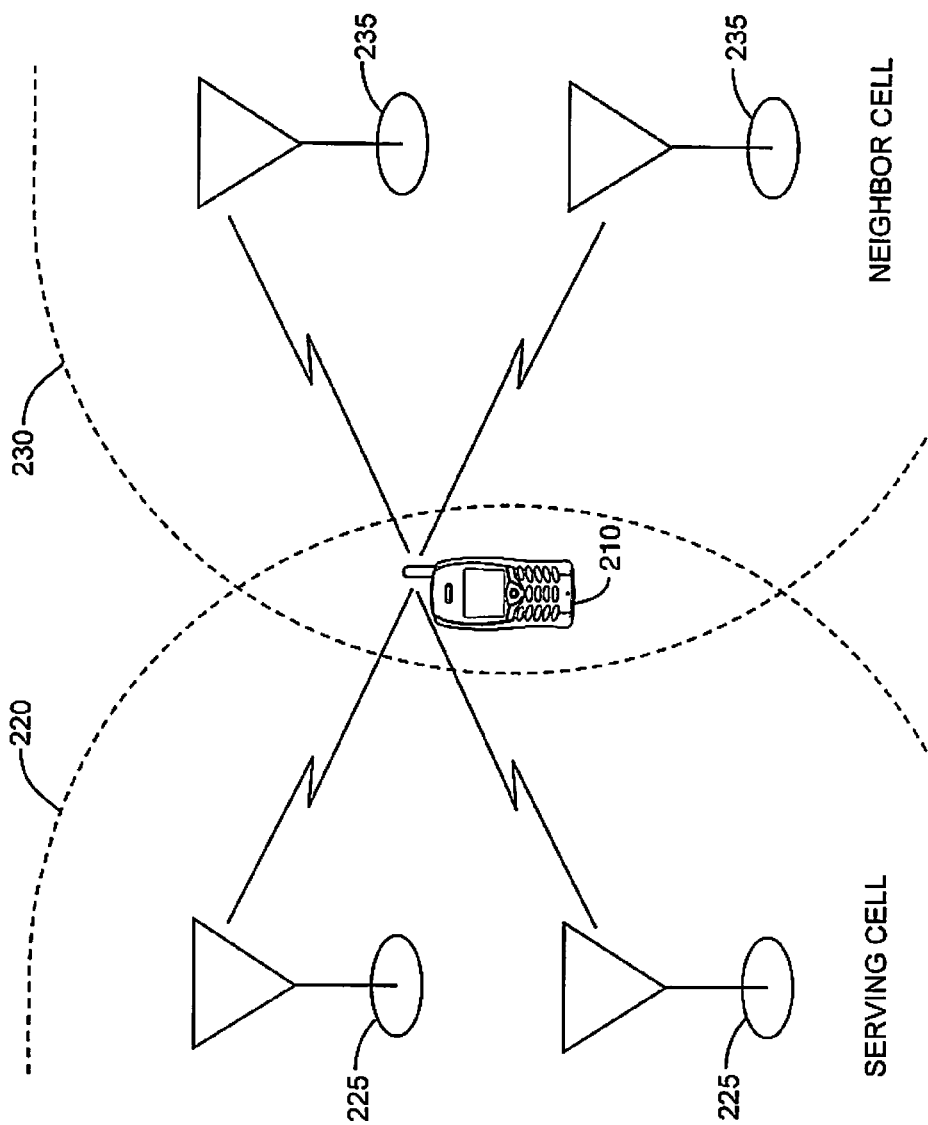
FIG. 2 illustrates a mobile terminal communicating with a serving cell and monitoring signals from a neighbor cell.

In a DAS cell, a user is typically served by multiple subcells, which belong to the serving DAS cell. This is shown in FIG. 2, in which mobile terminal 210 is simultaneously receiving signals from two sub-base stations 225 in the serving DAS cell 220. As described above, the coordinated transmission from multiple sites reduces inter-cell interference. In a network comprising of multiple DAS cells the users will also move between different DAS cells. Thus, referring to FIG. 2, handover between serving DAS cell 220 and neighbor DAS cell 230 is supported. In order to prevent inter-cell interference after the handover, the new DAS cell should start serving the user from multiple subcells, e.g., DAS subcells 235, as soon as possible. This can be realized by providing the target DAS cell a list of the strongest subcells (belonging to the target DAS cell), as received by the mobile terminal 210, at the time of handover. This list of strongest reported subcells can comprise or be derived from one or more neighbor cell measurements (e.g. RSRP or RSRQ), or it may simply comprise of reported events (e.g., the RSRP of a given subcell is above a certain threshold), or some combination thereof. The measurements and event evaluation are performed over cells and subcells, which are identified via a suitable cell search procedure.

Generally speaking, a mobile terminal maintains a list of strongest identified subcells in one or more target DAS cells by regularly searching for subcell-specific signals, in addition to common channel signals (corresponding to entire DAS cells), on a regular basis. The mobile terminal then performs measurements, evaluate events, and reports necessary events and/or measurement results to the serving DAS cells, for these identified subcells and DAS cell signals. Based on these results the serving DAS cell may perform handover and would also provide a list of strongest subcells to the target DAS cell. In this way the target DAS cell can resume the transmission to the user from the strongest subcells without any additional delay. To avoid an exhaustive number of measurements and event evaluation activities, and to reduce signaling overheads from corresponding reports, mobile terminals according to some embodiments of the present invention may be configured to selectively measure and evaluate certain target subcell signals, e.g., so that the subcell-specific signals are measured and/or corresponding events evaluated only when the corresponding DAS cell common channel signals are within a reasonable range.

Figure 4:
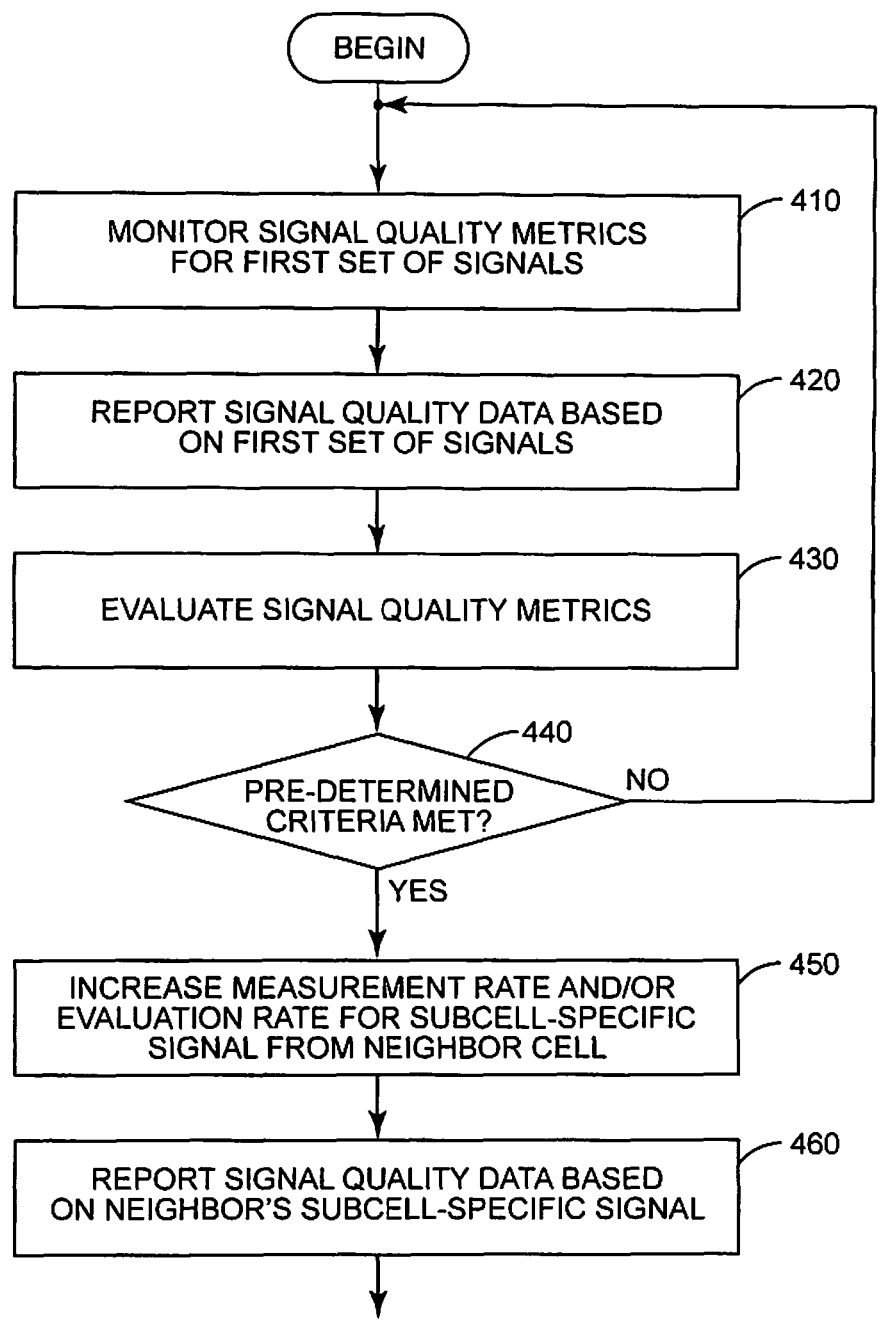
FIG. 4 is a process flow diagram illustrating an exemplary method of reporting downlink signal measurement information in a wireless network utilizing DAS.

FIG. 4 is a process flow diagram illustrating a general method of reporting downlink signal measurement information, according to some embodiments of the present invention, such as might be implemented in a in a wireless terminal served by a serving cell in a wireless communication system that utilizes coordinated multipoint transmission from two or more subcells in each of a plurality of cells. The process pictured in FIG. 4 begins, as shown at block 410, with the monitoring of signal quality metrics for a first set of downlink signals that includes at least a first common channel signal transmitted from two or more subcells of a neighbor cell. As discussed above, this common channel signal may comprise a common synchronization signal, common reference symbols, or the like. Because it is transmitted from all of the subcells in the neighbor DAS cell, the monitored signal quality metric represents an overall signal quality for the neighbor cell. As will be discussed in further detail below, this first set of monitored downlink signals may include other signals as well, e.g., common channel signals for one or more additional neighbor cells, subcell-specific signals for various identified subcells, etc.

The process pictured in FIG. 4 continues with the reporting of signal quality data, based on the monitored first set of signals, as shown at block 420. Thus, for example, RSRP and/or RSRQ for the target DAS cell might be reported, and/or an event corresponding to the monitored signal quality metrics might be reported, such as when the monitored signal quality metric for the common channel signal from the neighbor cell exceeds a predetermined threshold configured by the network.

As shown at block 430, the monitored signal quality metrics are further evaluated to determine whether one or more pre-determined criteria are met, as indicated at block 440. These pre-determined criteria may correspond directly with one or more reported events, or may differ. If none of the pre-determined criteria are met, then monitoring and reporting processes are repeated. If at least one criteria is met, on the other hand, a measurement rate, an event evaluation rate, or both, is increased for at least one subcell-specific signal from the neighbor cell, as shown at block 450, and corresponding signal quality data (e.g., measurement data, such as RSRP or RSRQ, or event data) is reported to the network, as shown at block 460.

Those skilled in the art will appreciate that the technique illustrated in FIG. 4 permits a mobile terminal to periodically monitor only a subset of the identified and/or available neighbor cell signals, and to increase the set of measured and evaluated signals only when it is advantageous to do so. This might occur, for example, when a common channel signal for a neighbor cell becomes sufficiently strong. An alternative way to view the general technique illustrated in FIG. 4 is that it permits a mobile terminal to measure and/or evaluate one or more subcell-specific signals at a background rate, and to increase that rate in response to a change in signal conditions for a monitored signal or set of signals, such as a common channel signal for a neighbor DAS cell. Those skilled in the art will appreciate that these "alternatives" are actually just variants of the same approach, as the background rate for a given subcell-specific signal might be zero (indicating that the signal is not periodically measured and/or evaluated), and selectively increased to some rate greater than zero in response to a change in the monitored signals.

A variety of criteria may be used to determine whether to selectively increase a measurement rate for one or more subcell-specific signals. These criteria may be signaled to the mobile terminal by the wireless network, in some embodiments, and may include, but are not limited to, those discussed briefly above. Although some of these criteria are discussed further below, in connection with FIGS. 5-10, those skilled in the art will appreciate that many variants of these criteria are possible and fall within the scope of the present invention.

Figure 5:
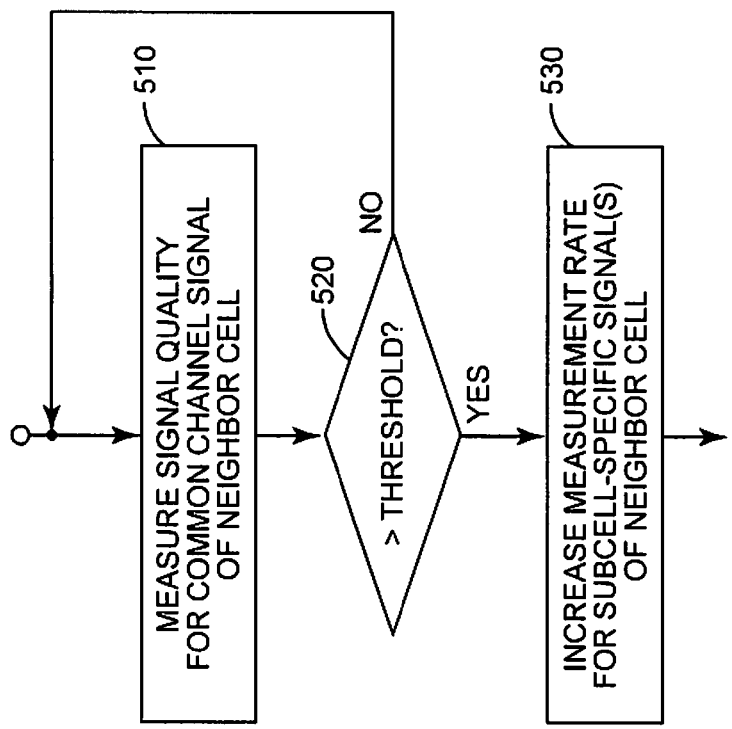
FIG. 5 is another process flow diagram illustrating details of some embodiments of a method of reporting downlink signal measurement information.

The application of one of these criteria is illustrated in FIG. 5. In some embodiments, a mobile terminal may be configured to regularly measure a received signal quality metric, such as a signal-to-interference-plus-noise ratio (SINR), for a common channel signal of an identified target DAS cell. This is shown at block 510. The received signal quality metric can be determined from one or more suitable common channels transmitted by the target DAS cell, such as a synchronization channel (SCH), common reference signals (CRS), broadcast channel, or the like.

This measured signal quality metric is then compared to a predetermined threshold, as shown at block 520. In the event that the measured signal quality metric does not exceed the threshold, then the mobile terminal simply continues to monitor the common channel signal for the neighbor cell. However, in the event that the measured signal quality metric is above the threshold, then the mobile terminal increases a measurement rate for one or more signal quality metrics (e.g., RSRP and RSRQ) for an already identified subcell-specific signal from a sub-base station located in the target neighbor cell.

As explained above, the background rate for measuring or evaluating events for the subcell-specific signal may be effectively zero, so that the method pictured in FIG. 5 results in a measurement and/or evaluation of a given subcell-specific signal for the first time. Alternatively, a given subcell-specific signal may be periodically measured and/or evaluated at a relatively low background rate, and the measurement and/or event evaluation rate selectively increased in response to a rise in the monitored common channel signal for the neighbor cell.

The rationale underlying the criteria illustrated in FIG. 5 is that if the common channel signal cell quality for a neighbor DAS cell is poor, then handover to this DAS cell is less likely to happen. Thus, measurement reports from subcells of this target DAS cell are not urgently needed. The threshold values used by the mobile terminal to evaluate this criteria can either be internally determined by the mobile terminal in some embodiments, signaled to the mobile terminal by the network in others, or specified in the standard (i.e., hard-configured in the mobile terminal) in still others.

Figure 6:
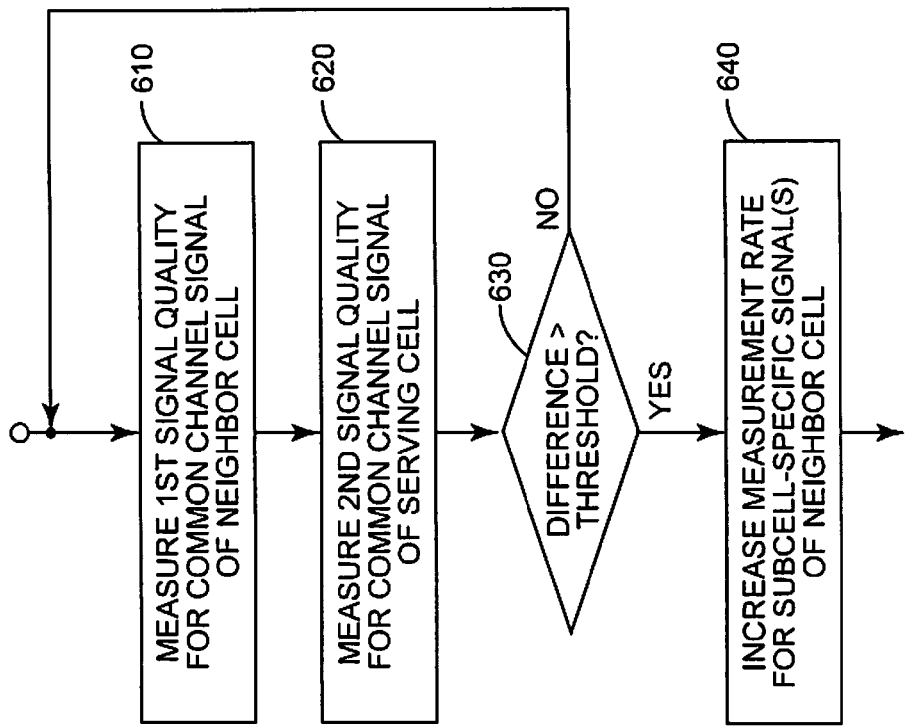
FIG. 6 is another process flow diagram illustrating details of other embodiments of a method of reporting downlink signal measurement information.

FIG. 6 illustrates the application of a second criterion, in which an increase in measurement rate for a subcell-specific signal is increased based on a comparison between common channel signals for a target (neighbor) DAS cell and a common channel signal for the serving cell. By regularly performing DAS cell and subcell search, the mobile terminal maintains a list of a predetermined number (e.g., K) of strongest identified DAS cells, and may also maintain a list of a second predetermined number (e.g., N) of strongest identified subcells in each DAS cell. With conventional approaches to neighbor cell measurements and event evaluation, the mobile terminal would frequently have to measure a large number of subcells (e.g., K times N), evaluate the corresponding events, and report the measurements and/or events to the network.

Using the approach pictured in FIG. 6, the mobile terminal routinely measures a first signal quality metric (e.g., SINR) for a common channel signal from the neighbor DAS cell, as shown at block 610, as well as a second signal quality metric for a common channel signal from the serving cell, as shown at block 620. The mobile terminal then regularly compares the signal quality metric for the target DAS cell to that of the serving DAS cell. If the signal quality for the target DAS cell is greater than that of the serving DAS cell by a pre-determined threshold, as shown at block 630, then the mobile terminal begins measurements and/or event evaluations (or increases a rate for measurements and/or event evaluations) for one or more subcell-specific signals form the target DAS cell, as shown at block 640. Otherwise the mobile terminal does not measure or evaluate the subcells of this target DAS cell, and continues to monitor the common channel signals for the target cell and the neighbor cell. As with the method illustrated in FIG. 5, the comparison of the target and serving DAS cells can be based on only type of common channel, or it can be based on various combinations of common channel signals. Those skilled in the art will further appreciate that two or more target DAS cells can be monitored by the mobile terminal, with the subcell-specific signals for each only selectively measured and evaluated, based on the comparison of the target DAS cell signal to the serving cell signal. As in the previous embodiment, threshold values used in this approach may be internally determined by the mobile terminal, signaled to the mobile terminal by the network, or specified in the standard.

Figure 7:
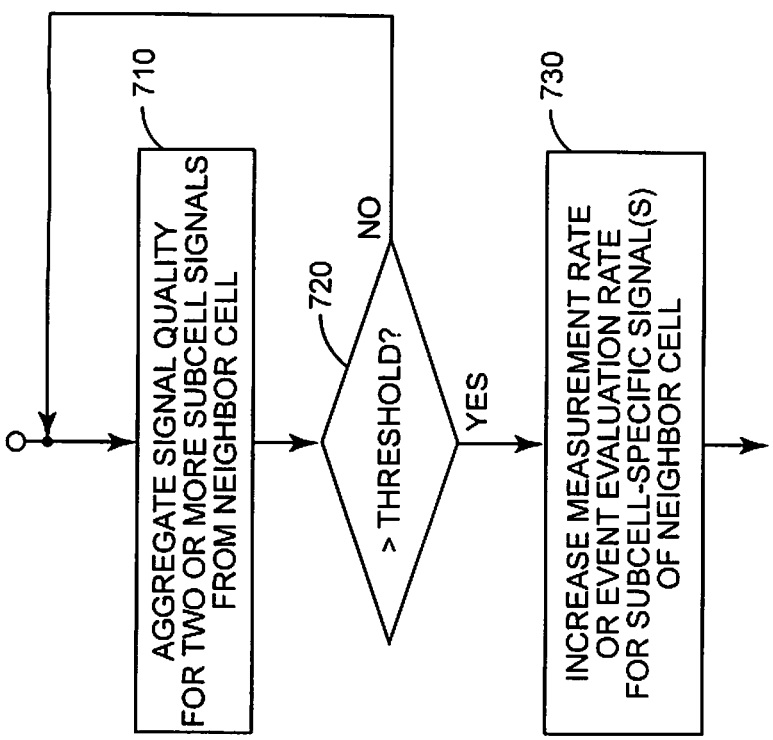
FIG. 7 is another process flow diagram illustrating details of other embodiments of a method of reporting downlink signal measurement information.

FIG. 7 illustrates another criterion that might be utilized in some embodiments of the present invention. With this approach, as with the previous one, the mobile terminal also maintains a list of N strongest identified subcells in an identified target DAS cell. In this case, however, the mobile terminal also regularly estimates some aggregate quality (e.g. mean value) of M (M≤N) strongest subcells in the target DAS cell, as shown at block 710. If the aggregate quality of M strongest subcells is above a predetermined threshold, as shown at block 720, then the mobile terminal starts evaluating the events related to these subcells and reports the corresponding events to the serving DAS cell whenever they are triggered. As in previous embodiments, another option is that the mobile terminal does perform subcell measurements and event evaluation with some lower default rate, but increase the rate of that activity when aggregate quality of M subcells is above the threshold. As noted above, the first of these alternatives is simply a special case of the latter. Although the technique pictured in FIG. 7 requires the mobile terminal to perform some subcell-specific measurements, to obtain the aggregated subcell signal quality, the event evaluation and reporting overheads are still greatly reduced compared to the exhaustive measurement and event evaluation approach.

Figure 8:
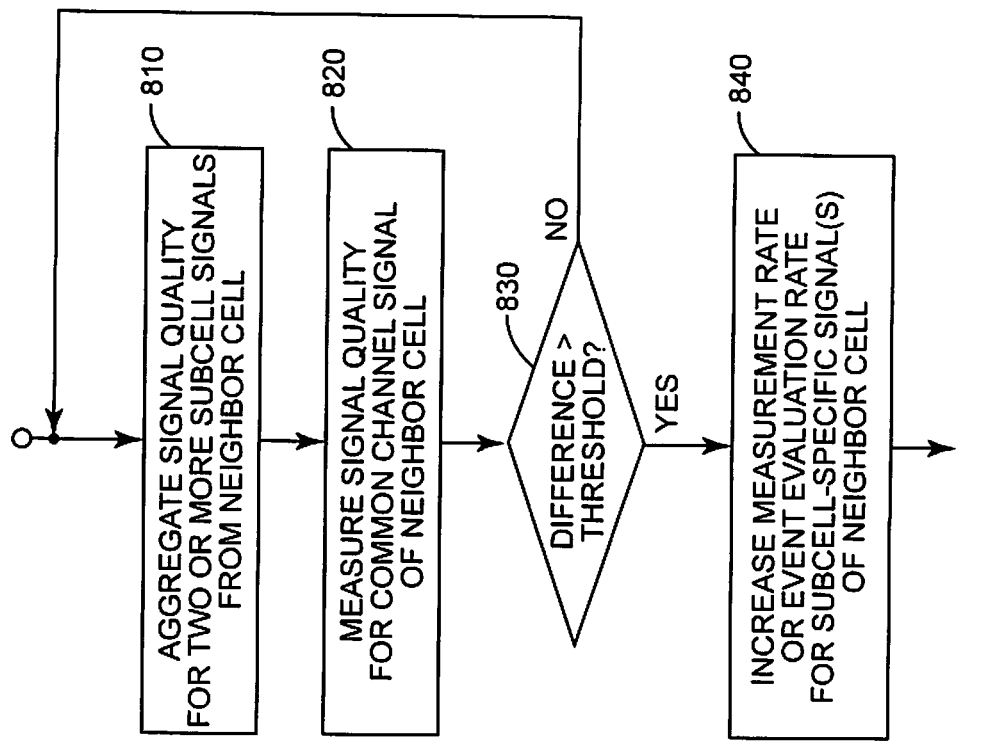
FIG. 8 is another process flow diagram illustrating details of other embodiments of a method of reporting downlink signal measurement information.
Figure 9:
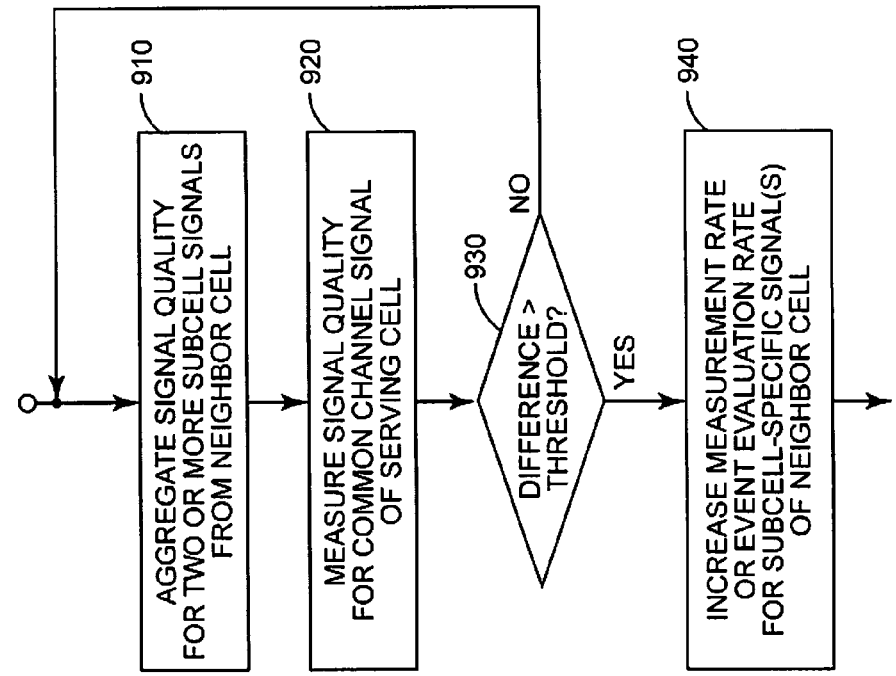
FIG. 9 is another process flow diagram illustrating details of other embodiments of a method of reporting downlink signal measurement information.

FIGS. 8 and 9 illustrate variants of the process illustrated in FIG. 7, in which the criterion is based on a relative difference between an aggregated quality of M strongest subcells and a common channel signal quality rises above a predetermined threshold. As before, the mobile terminal also maintains a list of N strongest identified subcells in an identified target DAS cell. Similarly, the mobile terminal regularly estimates some aggregated quality (e.g., mean value) of M (M≤N) strongest subcells in each target DAS cell as well, as shown at each of blocks 810 and 910. Furthermore, the mobile terminal measures a common channel signal quality for a neighbor cell (block 820 of FIG. 8) and/or for the serving cell (block 920 of FIG. 9). If the difference between the aggregated quality of the M strongest subcells and the quality of the common channel signal becomes higher than a predetermined threshold (as shown at each of blocks 830 and 930), then the mobile terminal increases a measurement rate, an evaluation rate, or both, for one or more subcell-specific signals for the neighbor cell, as shown at blocks 840 and 940.

In the method illustrated in FIG. 8 the comparison is done between the aggregate quality of subcells signal for the target cell and a common channel signal quality for the target cell. In the method illustrated in FIG. 9, the comparison is done instead between an aggregated subcell signal quality for the target cell and a common channel signal quality for the serving DAS cell. These techniques can be combined, of course, and/or two or more target cells monitored using these approaches. In either case, the same or different threshold values might be used.

In yet another variation of the above-described techniques, no aggregated signal quality for a set of subcells is estimated. Instead, if the difference between the quality of an identified subcell and that of a DAS cell becomes higher than a predetermined threshold, then the mobile terminal begins evaluating the events related to that subcell and reporting the corresponding events, when triggered, to the serving DAS cell. Alternatively, the mobile terminal performs subcell measurements and event evaluation for a particular subcell signal with some lower default rate, and increases the rate of the activity when a relative difference between the quality of the subcell and the DAS cell quality is above the threshold.

Figure 10:
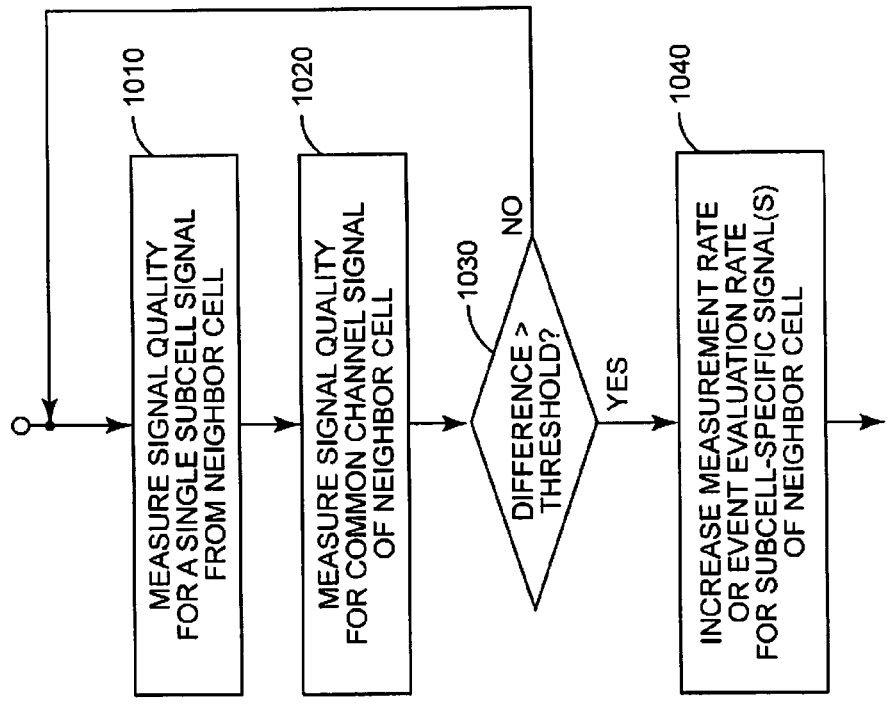
FIG. 10 is another process flow diagram illustrating details of other embodiments of a method of reporting downlink signal measurement information.
Figure 11:
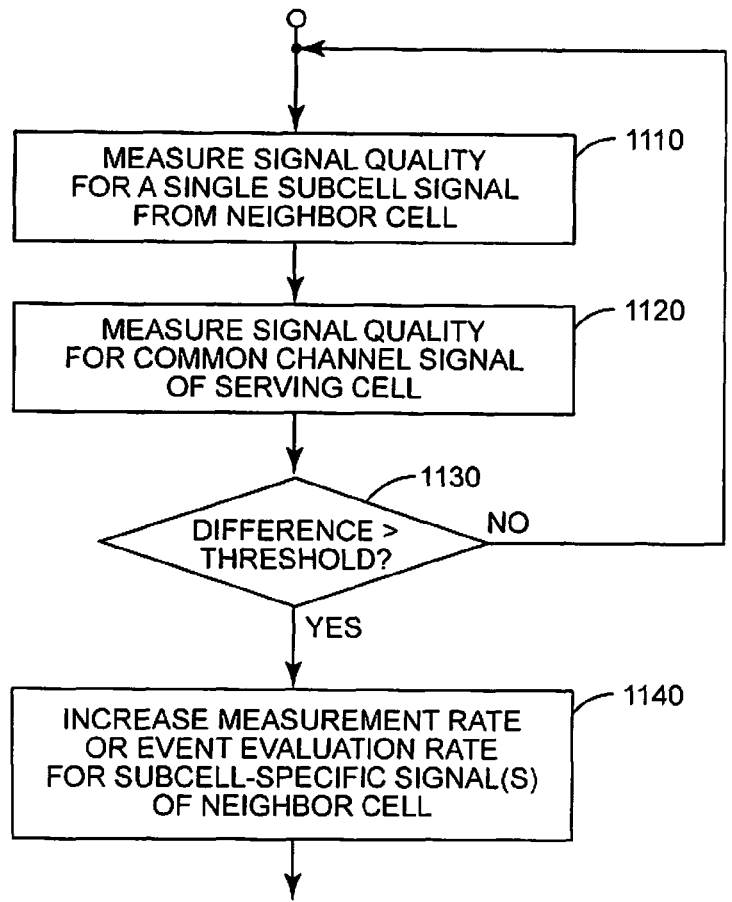
FIG. 11 is yet another process flow diagram illustrating details of other embodiments of a method of reporting downlink signal measurement information.

One embodiment of this variation is pictured in FIG. 10. A signal quality metric for a single subcell signal from the neighbor cell is measured, as shown at block 1010. At block 1020, a signal quality for a common channel signal of the neighbor cell is measured. At block 1030, the difference between these two signal qualities is compared to a threshold. If the difference exceeds the threshold, then a measurement rate or evaluation rate, or both, are increased for the subcell-specific signal. In an alternative, the subcell-specific signal quality can be compared to a common channel signal quality for the serving cell, rather than for the neighbor cell. This alternative is illustrated in FIG. 11, in which blocks 1110, 1120, 1130, and 1140 correspond directly to blocks 1010, 1020, 1030, and 1040 of FIG. 10. As in all of the embodiments discussed herein, the threshold and other configuration parameters are internally determined by the mobile terminal, can be signaled to the mobile terminal by the network, or specified in the standard and preconfigured in the mobile terminal.

Figure 3:
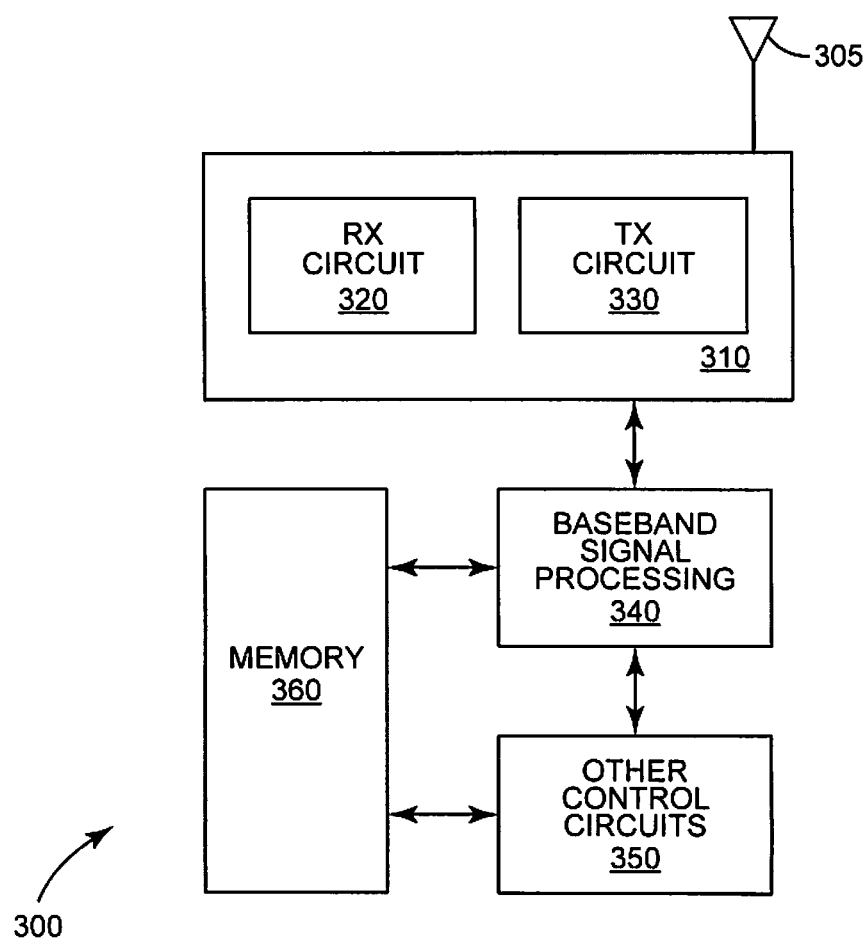
FIG. 3 is a block diagram illustrating functional elements of an exemplary mobile terminal, according to some embodiments of the present invention.

As noted above, any of the methods illustrated in FIGS. 4-11, and variants thereof, may be implemented in a wireless communication device configured for operation in a wireless network that supports DAS technology. FIG. 3 illustrates an exemplary embodiment of one such wireless communication device. Those skilled in the art will appreciate that wireless communication device 300 may be a cellular radiotelephone, a wireless pager, or part of a computer, network interface card, or other electronic device, system or access terminal with wireless communication capability. In the pictured embodiment, wireless device 300 includes at least one antenna 305 and a radio-frequency front-end circuit 310, which in turn includes a receiver (RX) circuit 320 and a transmitter (TX) circuit 330. RX circuit 320 and TX circuit 330 may each include (or may share, in some embodiments) one or more low-noise amplifiers, filters, down-converters, radio-frequency oscillators, analog-to-digital converter (ADC) circuits, digital-to-analog converter (DAC) circuits, and the like, configured for operation in one or more wireless networks according to well-known communication receiver design techniques. In particular, RX circuit 320 and TX circuit 330 may be configured for operation in an advanced E-UTRAN network, in some embodiments.

Wireless device 300 further includes a baseband signal processing circuit 340, which processes signals received from RX circuit 320 and prepares signals for transmission by TX circuit 330. Those skilled in the art will appreciate that some embodiments of wireless device 300 may support diversity operation, Multiple-Input Multiple-Output (MIMO) operation, or the like, in which case at least two receive antennas may be used and the RX circuit 320 and the baseband signal processing circuit 340 may include two or more "receiver chains" for filtering, amplifying, downconverting, and processing the received signals incoming on the different antennas 305 and combining the results in an appropriate manner.

Those skilled in the art will appreciate that the simplified block diagram of FIG. 3 is presented for illustrative purposes only, and omits many details that are unnecessary to a full understanding of the present invention. Those skilled in the art will further appreciate that the functional blocks of baseband signal processor 340 may be implemented on a single application-specific integrated circuit (ASIC) in some embodiments, or using two or more separate integrated circuits (ICs). Any of these ASICs or ICs may comprise one or more microprocessors, microcontrollers, digital signal processors (DSPs) or the like, which may in turn be configured with program instructions in the form of firmware and/or software stored in on-board and/or off-board memory 360. Memory 360 may comprise one or more of Random-Access Memory (RAM), Read-Only Memory (ROM), Flash memory, or other volatile or nonvolatile memory components. In addition to program instructions for configuring baseband signal processor 340 to carry out one or more of the specific measurement, event evaluation, and reporting techniques described herein, these memories may include additional program instructions for implementing other physical layer, link layer, network layer, and transport layer operations, according to system specifications such as the 3GPP standards for E-UTRA or advanced E-UTRA. These memories may further include program instructions for higher-layer functionalities, including user applications, and/or may include program instructions implementing one or more interfaces to other processors and/or other control circuits 350 that provide these functionalities.

Figure 12:
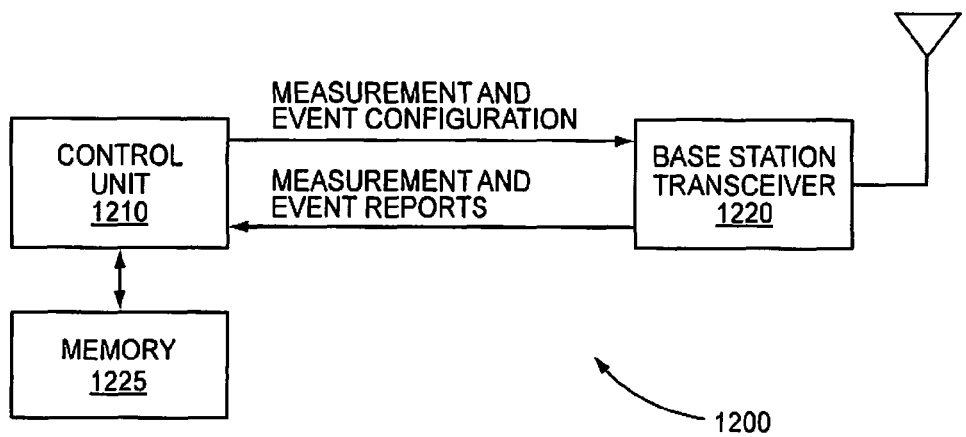
FIG. 12 is a block diagram illustrating functional elements of an exemplary base station system according to some embodiments of the present invention.

Those skilled will also appreciate that similar considerations apply to the simplified block diagram of FIG. 12, which pictures a base station 1200 according to some embodiments of the invention. Base station 1200 includes a control unit 1210, a base station transceiver 1220, and memory 1225. Base station transceiver 1220 includes one or more low-noise amplifiers, high-power amplifiers, filters, down-converters, radio-frequency oscillators, analog-to-digital converter (ADC) circuits, digital-to-analog converter (DAC) circuits, and other circuitry necessary to provide radio communications services to one or more mobile stations according to system specifications such as the 3GPP standards for E-UTRA or advanced E-UTRA. Likewise, control unit 1210 is configured to carry out at least physical layer and link layer operations according to the appropriate system specifications, such as the E-UTRA specifications developed by 3GPP. Control unit 1210 may comprise one or more microprocessors, microcontrollers, digital signal processors (DSPs) or the like, which may in turn be configured with program instructions in the form of firmware and/or software stored in on-board and/or off-board memory 1225. Memory 1225 may comprise one or more of Random-Access Memory (RAM), Read-Only Memory (ROM), Flash memory, or other volatile or nonvolatile memory components.

As discussed above, a variety of criteria may be used by a mobile terminal to determine whether to selectively increase a measurement rate for one or more subcell-specific signals. In some embodiments of the present invention, these criteria may be signaled to the mobile terminal by a serving base station, such as the base station system 1200 of FIG. 12. The criteria may include any of those discussed above. Thus, for example, various embodiments of control unit 1210 are configured to send measurement configuration information to one or more mobile terminals, using base station transceiver 1220, such that the measurement configuration information corresponds to at least one common channel signal transmitted from two or more subcells of a neighbor cell and at least a first subcell-specific signal of the neighbor cell. The measurement configuration information may include measurement threshold data, event trigger information, or both, for use by the mobile terminals in evaluating signal quality metrics for monitored downlink signals.

Specifically, the transmitted measurement configuration information specifies at least one criterion to the one or more mobile terminals for selectively increasing a measurement rate, an event evaluation rate, or both, for a second subcell-specific signal from the neighbor cell, based on an evaluation of at least the common channel signal transmitted from two or more subcells of a neighbor cell. Those skilled in the art will appreciate that this second subcell-specific signal may be a signal for which measurement configuration information was not transmitted. Accordingly, the control unit 1210 in some embodiments is further configured to receive, via the base station transceiver, signal quality data reported by one or more of the mobile terminals, the signal quality comprising measurement data, an event report, or both, corresponding to at least a second subcell-specific signal for which measurement configuration information was not transmitted.

Of course, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method, in a wireless terminal served by a serving cell in a wireless communication system utilizing coordinated multipoint transmission from two or more subcells in each of a plurality of cells, of reporting downlink signal measurement information, the method comprising:
    monitoring, in the wireless terminal, signal quality metrics for a first set of downlink signals comprising a first common channel signal transmitted utilizing the coordinated multipoint transmission from two or more subcells of a neighbor cell;
    evaluating the monitored signal quality metrics in the wireless terminal;
    selectively increasing, in the wireless terminal, at least one of a measurement rate and
    an event evaluation rate for at least a first subcell-specific signal from the neighbor cell, based on said evaluating; and
    reporting signal quality data based on the first subcell-specific signal from the wireless terminal to a serving base station
    wherein selectively increasing at least one of the measurement rate and the event evaluation rate comprises increasing the measurement rate for the first subcell-specific signal from a first rate to a second rate, wherein the first rate is greater than zero.

2. The method of claim 1, wherein reporting the signal quality data based on the first subcell-specific signal comprises reporting measured signal quality data for the first subcell-specific signal to the serving base station.

3. The method of claim 1, reporting the signal quality data based on the first subcell-specific signal comprises reporting event evaluation results based on the first subcell-specific signal to the serving base station.

4. The method of claim 1, wherein evaluating the monitored signal quality metrics comprises comparing a measured signal quality for the first common channel signal to a predetermined threshold, and wherein increasing the measurement rate comprises increasing the measurement rate for the first subcell-specific signal if the measured signal quality exceeds the predetermined threshold.

5. The method of claim 1 wherein the first set of downlink signals further comprises at least a second common channel signal transmitted from two or more subcells of the serving cell, wherein evaluating the monitored signal quality metrics comprises comparing a first quality metric for the first common channel signal to a second quality metric for the second common channel, and wherein increasing the measurement rate comprises increasing the measurement rate for the first subcell-specific signal if the difference between the first and second measured quality metrics exceeds a predetermined threshold.

6. The method of claim 1 wherein the first set of downlink signals further comprises at least two subcell-specific signals from the neighbor cell, wherein evaluating the monitored signal quality metrics comprises comparing an aggregate signal quality for two or more of the at least two subcell-specific signals from the neighbor cell to a predetermined threshold, and wherein increasing the measurement rate comprises increasing the measurement rate for the first subcell-specific signal if the aggregate signal quality is above the predetermined threshold.

7. The method of claim 1 wherein the first set of downlink signals further comprises at least two subcell-specific signals from the neighbor cell, wherein evaluating the monitored signal quality metrics comprises comparing an aggregate signal quality for two or more of the at least two subcell-specific signals from the neighbor cell to a predetermined threshold, and wherein selectively increasing at least one of the measurement rate and the event evaluation rate comprises increasing the event evaluation rate for at least one event related to the first subcell-specific signal if the aggregate signal quality is above the predetermined threshold.

8. The method of claim 1 wherein the first set of downlink signals further comprises at least two subcell-specific signals from the neighbor cell, wherein evaluating the monitored signal quality metrics comprises comparing an aggregate signal quality for two or more of the at least two subcell-specific signals from the neighbor cell to a second signal quality for the first common channel signal, and wherein increasing the measurement rate comprises increasing the measurement rate for the first subcell-specific signal if the difference between the aggregate signal quality and the second signal quality exceeds a predetermined threshold.

9. The method of claim 1 wherein the first set of downlink signals further comprises at least two subcell-specific signals from the neighbor cell and a second common channel signal transmitted from two or more subcells of the serving cell, wherein evaluating the monitored signal quality metrics comprises comparing an aggregate signal quality for two or more of the at least two subcell-specific signals from the neighbor cell to a second signal quality for the second common channel signal, and wherein increasing the measurement rate comprises increasing the measurement rate for the first subcell-specific signal if the difference between the aggregate signal quality and the second signal quality exceeds a predetermined threshold.

10. The method of claim 1 wherein the first set of downlink signals further comprises at least two subcell-specific signals from the neighbor cell, wherein evaluating the monitored signal quality metrics comprises comparing an aggregate signal quality for two or more of the at least two subcell-specific signals from the neighbor cell to a second signal quality for the first common channel signal, and wherein selectively increasing at least one of the measurement rate and the event evaluation rate comprises increasing the event evaluation rate for at least one event related to the first subcell-specific signal if the difference between the aggregate signal quality and the second signal quality exceeds a predetermined threshold.

11. The method of claim 1 wherein the first set of downlink signals further comprises at least two subcell-specific signals from the neighbor cell and a second common channel signal transmitted from two or more subcells of the serving cell, wherein evaluating the monitored signal quality metrics comprises comparing an aggregate signal quality for two or more of the at least two subcell-specific signals from the neighbor cell to a second signal quality for the second common channel signal, and wherein selectively increasing at least one of the measurement rate and the event evaluation rate comprises increasing the event evaluation rate for at least one event related to the first subcell-specific signal if the difference between the aggregate signal quality and the second signal quality exceeds a predetermined threshold.

12. The method of claim 1 wherein the first set of downlink signals further comprises at least one subcell-specific signal from the neighbor cell, wherein evaluating the monitored signal quality metrics comprises comparing a first signal quality for the one of the at least one subcell-specific signals from the neighbor cell to a second signal quality for the first common channel signal, and wherein increasing the measurement rate comprises increasing the measurement rate for the first subcell-specific signal if the difference between the first signal quality and the second signal quality exceeds a predetermined threshold.

13. The method of claim 1 wherein the first set of downlink signals further comprises at least one subcell-specific signal from the neighbor cell, wherein evaluating the monitored signal quality metrics comprises comparing a first signal quality for the one of the at least one subcell-specific signals from the neighbor cell to a second signal quality for the first common channel signal, and wherein selectively increasing at least one of the measurement rate and the event evaluation rate comprises increasing the event evaluation rate for at least one event related to the first subcell-specific signal if the difference between the first signal quality and the second signal quality exceeds a predetermined threshold.

14. The method of claim 1 wherein the first set of downlink signals further comprises at least one subcell-specific signal from the neighbor cell and a second common channel signal transmitted from two or more subcells of the serving cell, wherein evaluating the monitored signal quality metrics comprises comparing a first signal quality for the one of the at least one subcell-specific signals from the neighbor cell to a second signal quality for the second common channel signal, and wherein increasing the measurement rate comprises increasing the measurement rate for the first subcell-specific signal if the difference between the first signal quality and the second signal quality exceeds a predetermined threshold.

15. The method of claim 1 wherein the first set of downlink signals further comprises at least one subcell-specific signal from the neighbor cell and a second common channel signal transmitted from two or more subcells of the serving cell, wherein evaluating the monitored signal quality metrics comprises comparing a first signal quality for the one of the at least one subcell-specific signals from the neighbor cell to a second signal quality for the second common channel signal, and wherein selectively increasing at least one of the measurement rate and the event evaluation rate comprises increasing the event evaluation rate for at least one event related to the first subcell-specific signal if the difference between the first signal quality and the second signal quality exceeds a predetermined threshold.

16. The method of claim 1, wherein the signal quality metrics for the first common channel signal comprise at least one of:
   a received signal strength;
   a signal-to-interference-plus-noise ratio;
   a reference signal received power; and
   a reference signal received quality.

17. The method of claim 1, wherein the first common channel signal comprises at least one of:
   a common synchronization channel;
   common reference signals; and
   a broadcast channel.

18. The method of claim 1, wherein evaluating the monitored signal quality metrics comprises evaluating the monitored signal quality metrics relative to a predetermined threshold, the method further comprising receiving the predetermined threshold from the serving cell at the wireless terminal.

19. A wireless communication device for use in a wireless communication system utilizing coordinated multipoint transmission from two or more subcells in each of a plurality of cells, the wireless communication device comprising:
   receiver circuitry configured to receive downlink signals from a serving cell and one or more neighbor cells;
   transmitter circuitry configured to transmit uplink signals to a serving base station;
   and
   signal processing circuitry configured to:
   monitor signal quality metrics for a first set of downlink signals received via the receiver circuitry, the first set of downlink signals including a first common channel signal transmitted utilizing the coordinated multipoint transmission from two or more subcells of a neighbor cell;
   evaluate the monitored signal quality metrics;
   selectively increase at least one of a measurement rate and an event evaluation rate for at least a first subcell-specific signal from the neighbor cell based on said evaluation; and
   report signal quality data based on the first subcell-specific signal to a serving base station via the transmitter circuitry
   wherein the signal processing circuitry is configured to selectively increase at least one of the measurement rate and the event evaluation rate by increasing the measurement rate for the first subcell-specific signal from a first rate to a second rate, wherein the first rate is greater than zero.

20. The wireless communication device of claim 19, wherein the signal processing circuitry is configured to report signal quality data by reporting measured signal quality data for the first subcell-specific signal to the serving base station.

21. The wireless communication device of claim 19, wherein the signal processing circuitry is configured to report signal quality data based on the first subcell-specific signal by reporting event evaluation results based on the first subcell-specific signal.

22. The wireless communication device of claim 19, wherein the signal processing circuitry is configured to evaluate the monitored signal quality metrics by comparing a measured signal quality for the first common channel signal to a predetermined threshold, and to increase the measurement rate by increasing the measurement rate for the first subcell-specific signal if the measured signal quality exceeds the predetermined threshold.

23. The wireless communication device of claim 19 wherein the first set of downlink signals further comprises at least a second common channel signal transmitted from two or more subcells of the serving cell, and wherein the signal processing circuitry is configured to evaluate the monitored signal quality metrics by comparing a first quality metric for the first common channel signal to a second quality metric for the second common channel, and to increase the measurement rate by increasing the measurement rate for the first subcell-specific signal if the difference between the first and second measured quality metrics exceeds a predetermined threshold.

24. The wireless communication device of claim 19 wherein the first set of downlink signals further comprises at least two subcell-specific signals from the neighbor cell, and wherein the signal processing circuitry is configured to evaluate the monitored signal quality metrics by comparing an aggregate signal quality for two or more of the at least two subcell-specific signals from the neighbor cell to a predetermined threshold, and to increase the measurement rate by increasing the measurement rate for the first subcell-specific signal if the aggregate signal quality is above the predetermined threshold.

25. The wireless communication device of claim 19 wherein the first set of downlink signals further comprises at least two subcell-specific signals from the neighbor cell, and wherein the signal processing circuitry is configured to evaluate the monitored signal quality metrics by comparing an aggregate signal quality for two or more of the at least two subcell-specific signals from the neighbor cell to a predetermined threshold, and to selectively increase at least one of the measurement rate and the event evaluation rate by increasing the event evaluation rate for at least one event related to the first subcell-specific signal if the aggregate signal quality is above the predetermined threshold.

26. The wireless communication device of claim 19 wherein the first set of downlink signals further comprises at least two subcell-specific signals from the neighbor cell, and wherein the signal processing circuitry is configured to evaluate the monitored signal quality metrics by comparing an aggregate signal quality for two or more of the at least two subcell-specific signals from the neighbor cell to a second signal quality for the first common channel signal, and to increase the measurement rate by increasing the measurement rate for the first subcell-specific signal if the difference between the aggregate signal quality and the second signal quality exceeds a predetermined threshold.

27. The wireless communication device of claim 19 wherein the first set of downlink signals further comprises at least two subcell-specific signals from the neighbor cell and a second common channel signal transmitted from two or more subcells of the serving cell, and wherein the signal processing circuitry is configured to evaluate the monitored signal quality metrics by comparing an aggregate signal quality for two or more of the at least two subcell-specific signals from the neighbor cell to a second signal quality for the second common channel signal, and to increase the measurement rate by increasing the measurement rate for the first subcell-specific signal if the difference between the aggregate signal quality and the second signal quality exceeds a predetermined threshold.

28. The wireless communication device of claim 19 wherein the first set of downlink signals further comprises at least two subcell-specific signals from the neighbor cell, and wherein the signal processing circuitry is configured to evaluate the monitored signal quality metrics by comparing an aggregate signal quality for two or more of the at least two subcell-specific signals from the neighbor cell to a second signal quality for the first common channel signal, and to selectively increase at least one of the measurement rate and the event evaluation rate by increasing the event evaluation rate for at least one event related to the first subcell-specific signal if the difference between the aggregate signal quality and the second signal quality exceeds a predetermined threshold.

29. The wireless communication device of claim 19 wherein the first set of downlink signals further comprises at least two subcell-specific signals from the neighbor cell and a second common channel signal transmitted from two or more subcells of the serving cell, and wherein the signal processing circuitry is configured to evaluate the monitored signal quality metrics by comparing an aggregate signal quality for two or more of the at least two subcell-specific signals from the neighbor cell to a second signal quality for the second common channel signal, and to selectively increase at least one of the measurement rate and the event evaluation rate by increasing the event evaluation rate for at least one event related to the first subcell-specific signal if the difference between the aggregate signal quality and the second signal quality exceeds a predetermined threshold.

30. The wireless communication device of claim 19 wherein the first set of downlink signals further comprises at least one subcell-specific signal from the neighbor cell, and wherein the signal processing circuitry is configured to evaluate the monitored signal quality metrics by comparing a first signal quality for the one of the at least one subcell-specific signals from the neighbor cell to a second signal quality for the first common channel signal, and to increase the measurement rate by increasing the measurement rate for the first subcell-specific signal if the difference between the first signal quality and the second signal quality exceeds a predetermined threshold.

31. The wireless communication device of claim 19 wherein the first set of downlink signals further comprises at least one subcell-specific signal from the neighbor cell, and wherein the signal processing circuitry is configured to evaluate the monitored signal quality metrics by comparing a first signal quality for the one of the at least one subcell-specific signals from the neighbor cell to a second signal quality for the first common channel signal, and to selectively increase at least one of the measurement rate and the event evaluation rate by increasing the event evaluation rate for at least one event related to the first subcell-specific signal if the difference between the first signal quality and the second signal quality exceeds a predetermined threshold.

32. The wireless communication device of claim 19 wherein the first set of downlink signals further comprises at least one subcell-specific signal from the neighbor cell and a second common channel signal transmitted from two or more subcells of the serving cell, and wherein the signal processing circuitry is configured to evaluate the monitored signal quality metrics by comparing a first signal quality for the one of the at least one subcell-specific signals from the neighbor cell to a second signal quality for the second common channel signal, and to increase the measurement rate by increasing the measurement rate for the first subcell-specific signal if the difference between the first signal quality and the second signal quality exceeds a predetermined threshold.

33. The wireless communication device of claim 19 wherein the first set of downlink signals further comprises at least one subcell-specific signal from the neighbor cell and a second common channel signal transmitted from two or more subcells of the serving cell, and wherein the signal processing circuitry is configured to evaluate the monitored signal quality metrics by comparing a first signal quality for the one of the at least one subcell-specific signals from the neighbor cell to a second signal quality for the second common channel signal, and to selectively increase at least one of the measurement rate and the event evaluation rate by increasing the event evaluation rate for at least one event related to the first subcell-specific signal if the difference between the first signal quality and the second signal quality exceeds a predetermined threshold.

34. A wireless base station system for use in a wireless communication system utilizing coordinated multipoint transmission from two or more subcells in each of a plurality of cells, the wireless base station comprising a base station transceiver and a control unit configured to:
  transmit measurement configuration information to one or more mobile terminals, using the base station transceiver, the measurement configuration information corresponding to at least one common channel signal transmitted from two or more subcells of a neighbor cell and at least a first subcell-specific signal of the neighbor cell; and
  receive, via the base station transceiver, signal quality data reported by one or more of the mobile terminals, the signal quality comprising at least one of measurement data and an event report corresponding to at least a second subcell-specific signal for which measurement configuration information was not transmitted;
  wherein the measurement configuration information specifies at least one criterion to the one or more mobile terminals for selectively increasing a measurement rate for the second subcell-specific signal from the neighbor cell from a first rate to a second rate based on an evaluation of the common channel signal transmitted from two or more subcells of a neighbor cell and the first subcell-specific signal of the neighbor cell, wherein the first rate is greater than zero.

35. The base station of claim 34, wherein the measurement configuration information comprises measurement threshold data corresponding to one or more of the at least one common channel signal and the at least one subcell-specific signal of the neighbor cell.

36. The base station of claim 34, wherein the measurement configuration information comprises event trigger information corresponding to one or more of the at least one common channel signal and the at least one subcell-specific signal of the neighbor cell.

37. The base station of claim 34, wherein the measurement configuration information further specifies at least one criterion to the one or more mobile terminals for selectively increasing an event evaluation rate for the second subcell-specific signal from the neighbor cell, based on the evaluation of the common channel signal transmitted from two or more subcells of the neighbor cell and the first subcell-specific signal of the neighbor cell.

* * * * *

UNITED STATES PATENT AND TRADEMARK OFFICE
CERTIFICATE OF CORRECTION

PATENT NO. : 8,594,690 B2  
APPLICATION NO. : 13/142437  
DATED : November 26, 2013  
INVENTOR(S) : Kazmi et al.

Page 1 of 1

It is certified that error appears in the above-identified patent and that said Letters Patent is hereby corrected as shown below:

In the Specification

In Column 11, Line 4, delete "form" and insert -- from --, therefor.

In the Claims

In Column 14, Line 54, in Claim 1, delete "station" and insert -- station; --, therefor.

In Column 17, Lines 46-47, in Claim 19, delete "circuitry" and insert -- circuitry; --, therefor.

Signed and Sealed this
Twenty-second Day of July, 2014

Michelle K. Lee
*Deputy Director of the United States Patent and Trademark Office*